United States Patent
Fehrenbach et al.

(10) Patent No.: US 9,638,598 B2
(45) Date of Patent: May 2, 2017

(54) CAPACITIVE PRESSURE TRANSDUCER FOR MEASURING THE PRESSURE OF A MEDIUM ADJACENT TO THE MEASURING CELL

(71) Applicant: VEGA GRIESHABER KG, Wolfach (DE)

(72) Inventors: Josef Fehrenbach, Haslach (DE); Jörn Jacob, Wolfach (DE)

(73) Assignee: VEGA GRIESHABER KG, Wolfach (DE)

(*) Notice: Subject to any disclaimer, the term of this patent is extended or adjusted under 35 U.S.C. 154(b) by 0 days.

(21) Appl. No.: 14/655,180

(22) PCT Filed: Mar. 25, 2014

(86) PCT No.: PCT/EP2014/055970
§ 371 (c)(1),
(2) Date: Jun. 24, 2015

(87) PCT Pub. No.: WO2014/154695
PCT Pub. Date: Oct. 2, 2014

(65) Prior Publication Data
US 2016/0025582 A1    Jan. 28, 2016

(30) Foreign Application Priority Data
Mar. 27, 2013 (EP) .................... 13161336

(51) Int. Cl.
*G01L 19/04* (2006.01)
*G01L 19/00* (2006.01)
(Continued)

(52) U.S. Cl.
CPC ............ *G01L 9/0075* (2013.01); *G01L 9/125* (2013.01)

(58) Field of Classification Search
CPC ..... G01L 9/00; G01L 9/04; G01L 9/12; G01L 9/0075; G01L 9/125
See application file for complete search history.

(56) References Cited

U.S. PATENT DOCUMENTS 6,439,056 B1 *  8/2002  Jonsson ............... G01L 9/0075
                                                    73/708
6,619,130 B1 *  9/2003  Yutani ................. G01L 11/002
                                                    73/716
(Continued)

FOREIGN PATENT DOCUMENTS

CN         87209178 U    12/1987
CN         1975358 A      6/2007
(Continued)

OTHER PUBLICATIONS

International Search Report issued in corresponding PCT Application No. PCT/EP2014/055970, Jul. 29, 2014.
(Continued)

*Primary Examiner* — Nguyen Ha
(74) *Attorney, Agent, or Firm* — Juneau & Mitchell

(57) ABSTRACT

The invention relates to a capacitive pressure transducer for measuring the pressure of a medium adjacent to the pressure transducer, which has a resilient measuring diaphragm, of which the first side is at least partially in contact with the medium and of which the second side, which faces away from the medium, comprises a measuring electrode and, for measuring a temperature, a resistance element made of a material having a temperature dependent resistance. Furthermore, the pressure transducer has a base body, which is arranged to oppose the second side of the measuring diaphragm, with a counter electrode, which forms a measuring capacitance with the measuring electrode. According to the invention, the resistance element is formed as a resistive layer disposed between the second side of the measuring diaphragm and the measuring electrode.

7 Claims, 2 Drawing Sheets

(51) Int. Cl.
*G01L 9/12* (2006.01)
*G01L 9/00* (2006.01)

(56) References Cited

U.S. PATENT DOCUMENTS

| | | |
|---|---|---|
| 2002/0026835 A1 | 3/2002 | Jacob et al. |
| 2002/0124654 A1* | 9/2002 | Jacob .................. G01L 9/0075 73/708 |
| 2009/0178487 A1* | 7/2009 | Girroir ............... G01L 19/0092 73/716 |
| 2014/0088890 A1* | 3/2014 | Hao ....................... G01L 9/125 702/52 |

FOREIGN PATENT DOCUMENTS

| | | | | |
|---|---|---|---|---|
| DE | 40 11 901 A1 | | 10/1991 | |
| JP | 02306114 A | * | 12/1990 | ............. G01D 21/02 |
| JP | 03012529 A | * | 1/1991 | ............... G01L 1/14 |
| JP | 2012073141 A | * | 4/2012 | ............... G01L 19/04 |
| SU | 1812459 A1 | * | 4/1993 | ............... G01L 9/12 |

OTHER PUBLICATIONS

European Search Report in corresponding European application No. 13161336.6, Sep. 27, 2013.
Office Action from the CPO dated Jul. 11, 2016 issued in corresponding Chinese Patent Application 2014 8001 6620.2.

* cited by examiner

CAPACITIVE PRESSURE TRANSDUCER FOR MEASURING THE PRESSURE OF A MEDIUM ADJACENT TO THE MEASURING CELL

CROSS REFERENCE TO RELATED APPLICATIONS

This patent application claims priority to International Patent Application PCT/EP2014/055970, filed on Mar. 25, 2014, and thereby to European Patent Application 13161336.6, filed on Mar. 27, 2013.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a capacitive pressure transducer for measuring the pressure of a medium adjacent to a measuring cell.

Background of the Invention

Pressure transducers are known and are used in many areas of process engineering for process monitoring. In order to measure the pressure of a medium adjacent to the measuring cell, the measuring cell has a resilient measuring diaphragm, which is deflected as a function of the pressure prevailing inside the medium. In this case the deflection or more specifically the reversible deformation of the diaphragm is converted by electromechanical means into a corresponding electrical measurement signal. As the capacitive electromechanical transducer, a measuring electrode, which is arranged on the side of the measuring diaphragm that faces away from the medium, forms together with a counter electrode, which is arranged opposite a base body, a measuring capacitor having a capacitance that changes as a function of the pressure induced deflection of the measuring diaphragm. The measuring diaphragm forms, together with the base body, a measurement chamber that is pressure tight relative to the medium.

These capacitive pressure transducers have the problem that when a medium is used that rapidly changes its temperature, measurement errors occur in the measurement of the pressure because the measuring diaphragm is in direct contact with the medium, and is, therefore, affected by the fluctuations in the temperature of said medium.

It is known that the temperature or more specifically the slow variations in the temperature of the base body are determined by measuring the ambient temperature of said base body, and with these temperature measuring values the pressure measuring value is corrected accordingly. In the event of a large temperature differential between the measuring diaphragm and the base body of the pressure transducer, especially if the temperature of the medium changes rapidly or rather abruptly, this correction method results, nevertheless, in a faulty jump in the calculated pressure measuring value that slowly decreases to the correct measurement value only if the entire pressure transducer is allowed to thoroughly warm up Furthermore, it is known to measure both the temperature of the base body of the pressure transducer and the temperature of the measuring diaphragm of the pressure transducer, in order to determine a temperature compensated pressure measuring value, and to compensate for the pressure measuring value by means of these two temperature measuring values.

As a result, DE 40 11 901 A1, for example, discloses a capacitive pressure transducer, wherein the measuring diaphragm exhibits a resistance track made of a material having a temperature dependent resistance. In this case this resistance track is placed in the form of a circle around the circular measuring electrode, which forms a capacitor plate of the measuring capacitor, so that the resistance track runs only in the edge region of the measuring diaphragm. However, it has been demonstrated that the arrangement of the resistance track in the edge area cannot correctly measure the temperature of the measuring diaphragm, because the edge region of the measuring diaphragm rapidly cools down due to the dissipation of the heat into the adjacent parts of the housing, a feature that results in a measurement error.

Based on this prior art, the object of the present invention is to provide a pressure transducer of the type described in the introductory part in such a way that it is possible to measure the temperature of the measuring diaphragm of a pressure transducer with higher measuring precision than with the prior art.

This engineering object is achieved by means of a pressure transducer exhibiting the features disclosed herein.

BRIEF SUMMARY OF THE INVENTION

In a preferred embodiment, a capacitive pressure transducer for measuring a pressure of a medium adjacent to the pressure transducer, comprising a resilient measuring diaphragm, of which the first side is at least partially in contact with the medium and of which the second side, which faces away from the medium, comprises a measuring electrode, and, for measuring a temperature, a resistance element made of a material having a temperature dependent resistance; and a base body, which is arranged to oppose the second side of the measuring diaphragm, with a counter electrode, which forms a measuring capacitance with the measuring electrode, wherein the resistance element is formed as a resistive layer disposed between the second side of the measuring diaphragm and the measuring electrode.

In another preferred embodiment, the pressure transducer, as described herein, wherein the resistive layer and the measuring electrode are designed to be essentially congruent with each other.

In another preferred embodiment, the pressure transducer, as described herein, wherein the resistive layer is structured.

In another preferred embodiment, the pressure transducer, as described herein, wherein the resistive layer is structured so as to have a meandering shape.

In another preferred embodiment, the pressure transducer, as described herein, wherein the measuring diaphragm and/or the base body is/are made of a ceramic material.

In another preferred embodiment, the pressure transducer, as described herein, wherein the resistive layer is formed with a surface area that is larger than the area of the measuring electrode.

In another preferred embodiment, the pressure transducer, as described herein, wherein the resistive layer is formed with a surface area that is smaller than an area of the measuring electrode, wherein the resistive layer is formed so as to be radially spaced apart from a circumferentially formed glass seam.

In another preferred embodiment, a pressure transmitter comprising a pressure transducer, as described herein.

DETAILED DESCRIPTION OF THE INVENTION

Figure 1:
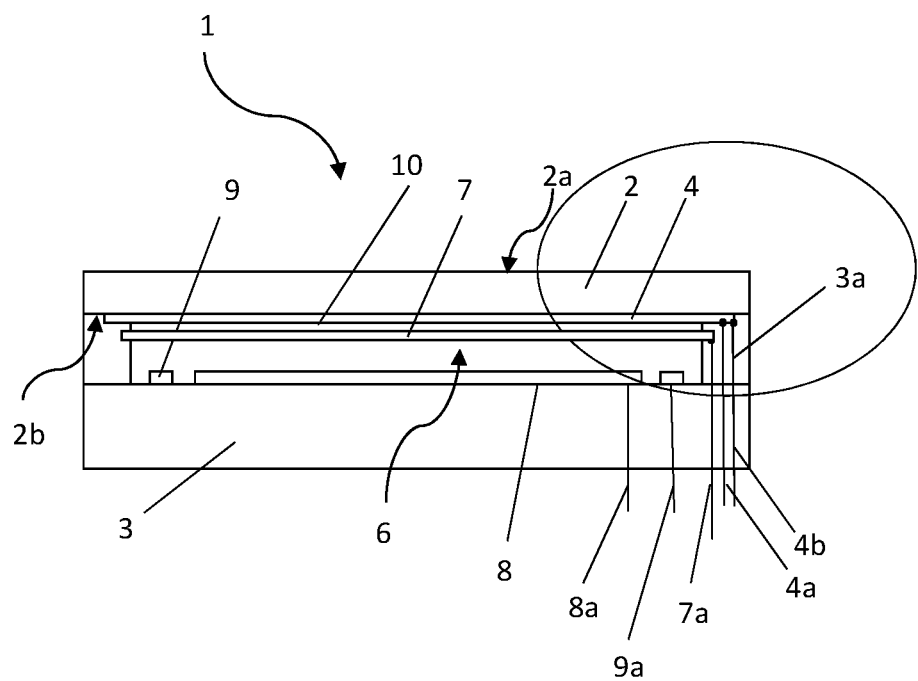
FIG. 1 is a line drawing evidencing, in schematic form, a sectional view of a pressure transducer as an exemplary embodiment according to the invention.

The invention is a capacitive pressure transducer for measuring the pressure of a medium, adjacent to the pressure transducer, comprising a resilient measuring diaphragm, of which the first side is at least partially in contact with the medium and of which the second side, which faces away from the medium, comprises a measuring electrode and, for measuring the temperature, a resistance element made of a material having a temperature dependent resistance; and comprising a base body, which is arranged opposite the second side of the measuring diaphragm, with a counter electrode, which forms a measuring capacitance with the measuring electrode, is characterized, according to the invention, in that the resistance element is formed as a resistive layer between the second side of the measuring diaphragm and the measuring electrode.

The advantage of such a pressure transducer according to the invention lies in the fact that virtually the entire available surface of the measuring diaphragm can be used for the resistive layer; and, as a result, the temperature conditions over the entire measuring diaphragm is considered in the temperature measurement, so that only small temperature errors occur.

Furthermore, it has been found with this pressure transducer of the invention that a rapid or more specifically an abrupt change in the temperature of the medium can be detected just as fast and directly.

It is possible to produce such a resistive layer with the same process as in the production of the measuring electrode, where in this case the two layers are separated from each other by means of an insulating layer. In order to produce the measuring electrode and the resistive layer, the same material, for example, gold, may be used; or different materials, such as, for example, gold for the measuring electrode and platinum/platinum compounds for the resistive layer, may be used.

It is particularly advantageous according to one embodiment of the invention, if the resistive layer and the measuring electrode are designed to be more or less congruent to each other. As a result, both the measuring electrode and the resistive layer can be produced with the same mask.

Furthermore, the resistive layer is structured, according to one embodiment of the invention, preferably so as to have a meandering structure. Then the insulating layer is used simultaneously as a planarization layer of the structured resistive layer, so that the measuring electrode can be applied to the planar insulating layer.

Finally, it is advantageous if the measuring diaphragm and/or the base body is/are made of a ceramic material.

The pressure transducer according to the invention can be used advantageously to build pressure transmitters.

DETAILED DESCRIPTION OF THE FIGURES

This capacitive measuring cell 1 comprises a measurement chamber 6, which is formed by a ceramic base body 3 and a measuring diaphragm 2, which is also made of ceramic. In order to produce the pressure tight measurement chamber 6, the measuring diaphragm 2 and the base body 3 are separated at the edge by way of a spacer 3a, which is made, for example, of glass, glass solder or a glass alloy, and are connected to each other.

With its external first side 2a the measuring diaphragm 2 is in contact with a medium, the pressure of which is to be measured with the measuring cell 1. The internal second side 2b of the measuring diaphragm 2 is coated with a resistive layer 4 made of a material exhibiting a temperature dependent resistance. This resistive layer 4 is designed either (i) to be formed over the entire surface and in a circular shape, or (ii) to have a meandering structure. Connecting leads 4a, 4b are run at the edge over the spacer 3a and the base body 3 to an electronic unit (not shown). The resistive layer 4 warms up in accordance with the measuring diaphragm 2, so that consequently the resistance value changes as a function of the temperature of the measuring diaphragm 2 and is evaluated as a measurement value for determining the temperature of the measuring diaphragm.

A measuring electrode 7 is arranged in a centered manner on the resistive layer 4 with the interposition of an insulating layer. According to FIG. 1, this measuring electrode 7 is designed with a diameter that is smaller than the diameter of the resistive layer 4, where in this case both the measuring electrode 7 and the resistive layer 4 protrude into the region of the spacer 3a; and their respective connecting leads 4a, 4b and 7a respectively run in the glass solder layer. In the present exemplary embodiment the resistive layer 4 is formed with a surface area that is larger than the area of the measuring electrode 7. That is, the resistive layer 4 extends beyond the measuring electrode 7 in the radial direction. This feature has the advantage that direct contact with each layer can be made without having to run additional leads.

However, the layer of the measuring electrode 7 and the resistive layer 4 may also be produced so as to be congruent with each other.

If the resistive layer 4 is structured so as to have a meandering shape, then the insulating layer is also used simultaneously as a planarization layer of the resistive layer 4, so that the measuring electrode 7 can be applied onto this planarized resistive layer 4. Then the connecting leads 4a, 4b of the resistive layer 4 can be arranged, for example, on radially opposite sides and can run through the glass seam 3a.

In an additional embodiment, which is not shown in greater detail here, the resistive layer 4 can also be formed with a surface area that is selected to be smaller than the area of the measuring electrode 7 and is arranged so as to be spaced apart from the circumferential glass seam 3a. In this case a temperature averaging over a central region of the measuring diaphragm 2 is achieved, so that any impact of a mounting arrangement, which is thermally a carrier due to its larger mass relative to the measuring diaphragm 2, is suppressed.

This measuring electrode 7 forms, together with a circular counter electrode 8, which is arranged so as to be on the opposite surface of the base body 3, a measuring capacitor, the measured capacitance of which is a function of the deflection of the measuring diaphragm 2, where in this case the deflection is caused by the pressure of the medium. The counter electrode 8 is enclosed by a circular ring shaped reference electrode 9, which, together with the measuring electrode 7, forms a reference capacitor, the reference capacitance of which is virtually constant due to its position at the outer edge of the measurement chamber 6, in which the measuring diaphragm shows essentially no deflection. The measuring electrode 7, the counter electrode 8 and the reference electrode 9 are connected to an electronic unit (not shown) of the measuring cell 1 by means of the connecting leads 7a, 8a and 9a respectively.

Figure 2:
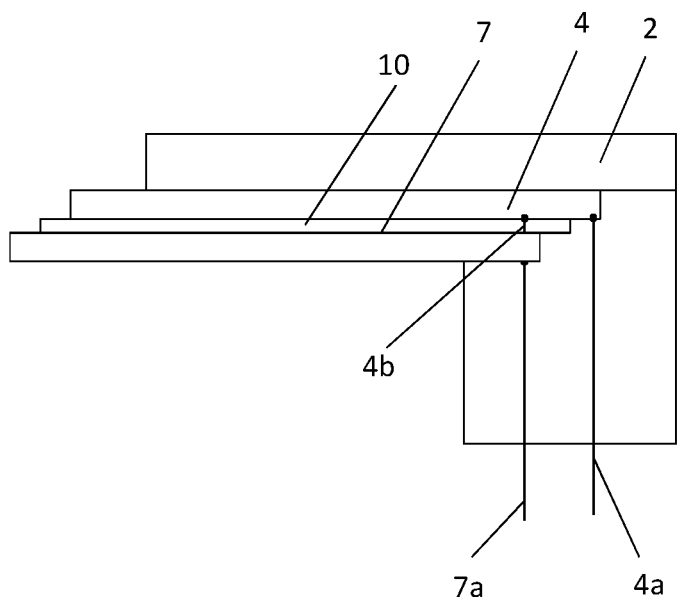
FIG. 2 is a line drawing evidencing an enlarged detail from FIG. 1.

FIG. 2 shows an enlarged detail from FIG. 1 in the region of the connecting leads of the resistive layer 4.

FIG. 2 shows very clearly a layered structure consisting of a measuring electrode 7, an insulating layer 10, a resistive layer 4 and a measuring diaphragm 2. As can be seen in FIG. 2, both the measuring electrode 7 and the resistive layer 4 are formed as far as into the radially arranged glass seam 3a, which is also used as a spacer 3a. This arrangement makes it possible for the connecting leads 7a, 4a, 4b, which run perpendicular to the measuring electrode and the resistive layer through the glass seam 3a, to make contact with both the measuring electrode 7 and the resistive layer 4.

It is also easy to see from FIG. 2 that the insulating layer 10 extends beyond the measuring electrode 7 in the radial direction, so that the net result is a reliable insulation of the measuring electrode 7 with respect to the resistive layer 4.

In addition, FIG. 2 also shows as an additional option that the second connecting lead 4b can be connected internally to the measuring electrode 7 in order to measure the temperature, so that the temperature measurement can take place between the electrodes 7a and 4a. As a result, there is no need to lead out the connecting lead 4b.

Figure 3:
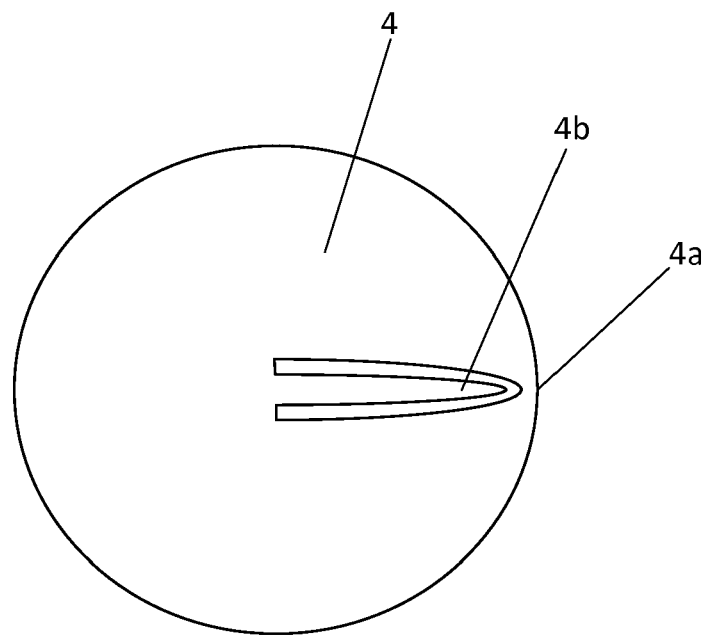
FIG. 3 is a line drawing evidencing a first exemplary embodiment of a structured resistive layer.

FIG. 3 shows, as seen in a plan view, a first exemplary embodiment of a resistive layer 4 with respect to how it can be used in the sensor from the FIGS. 1 and 2.

In the exemplary embodiment from FIG. 3, the metallization for the resistive layer 4 is carried out over the entire surface and has a U shaped recess, in order to produce a sufficiently long current path and, thus, a sufficiently large resistance. Inside this recess there is the second connecting lead 4b, which extends into this recess in the manner of a tongue.

Figure 4:
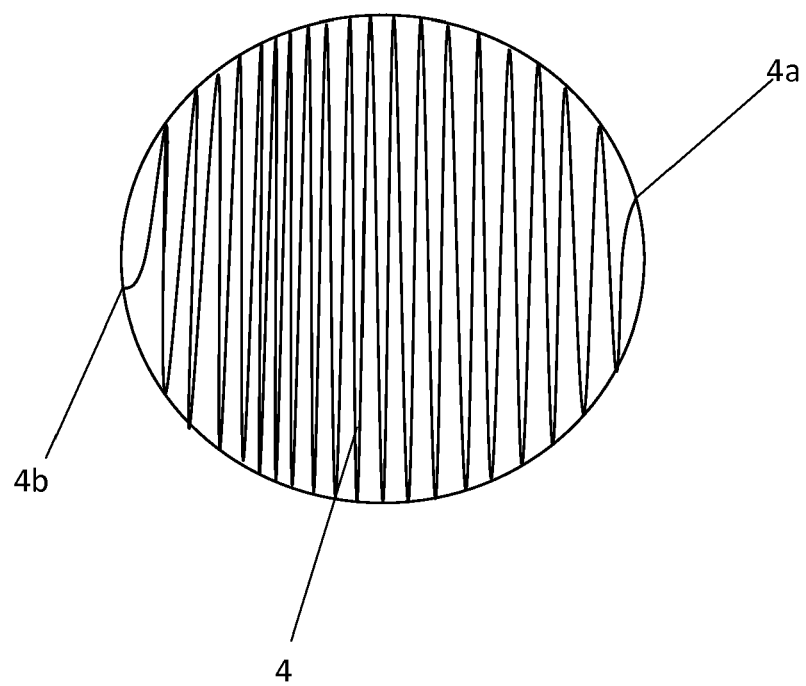
FIG. 4 is a line drawing evidencing a second exemplary embodiment of a structured resistive layer.

FIG. 4 shows an additional exemplary embodiment of a resistive layer 4 in a plan view, where in this embodiment the resistive layer 4 is designed so as to have a meandering shape on a circular surface area. By providing a plurality of meanders or more specifically a plurality of loops it is possible to produce, as compared with the exemplary embodiment from FIG. 3, a very long current path and, thus, also to produce a much larger resistance to the temperature measurement. In the exemplary embodiment from FIG. 4 the connecting leads 4a, 4b of the resistive layer are arranged on the radially opposite sides of the resistive layer 4, but can also be run immediately adjacent to each other through the spacer 7a by means, for example, of a conductor track, which runs in the circumferential direction, as shown in the FIGS. 1 and 2.

In this measuring cell 1, the pressure measuring signals, which are affected by the measurement errors and which are generated by the measuring capacitor, are corrected or more specifically are compensated for, according to a specified algorithm, by means of temperature values, which are determined from the temperature dependent resistance measuring values of the resistive layer 4.

LIST OF REFERENCE NUMBERS 1 pressure transducer
2 measuring diaphragm
2a first side of the measuring diaphragm 2
2b second side of the measuring diaphragm 2
3 base body
3a spacer
4 resistive layer
4a first connecting lead of the resistive layer 4
4b second connecting lead of the resistive layer 4
6 measurement chamber of the pressure transducer 1
7 measuring electrode
7a connecting lead of the measuring electrode 7
8 counter electrode
8a connecting lead of the counter electrode
9 reference electrode
9a connecting lead of the reference electrode The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A capacitive pressure transducer for measuring a pressure of a medium adjacent to the pressure transducer, comprising
   a resilient measuring diaphragm, of which the first side is at least partially in contact with the medium and of which the second side, which faces away from the medium, comprises a measuring electrode, and, for measuring a temperature, a resistance element made of a material having a temperature dependent resistance; and
   a base body, which is arranged to oppose the second side of the measuring diaphragm, with a counter electrode, which forms a measuring capacitance with the measuring electrode,
   wherein the resistance element is formed as a resistive layer disposed between the second side of the measuring diaphragm and the measuring electrode, wherein the resistive layer and the measuring electrode are separated from each other by means of an insulating layer.

2. The pressure transducer, as claimed in claim 1, wherein the resistive layer and the measuring electrode are designed to be essentially congruent with each other.

3. The pressure transducer, as claimed in claim 1, wherein the resistive layer is structured.

4. The pressure transducer, as claimed in claim 3, wherein the resistive layer is structured so as to have a meandering shape.

5. The pressure transducer, as claimed in claim 1, wherein the measuring diaphragm and/or the base body is/are made of a ceramic material.

6. The pressure transducer, as claimed in claim 1, wherein the resistive layer is formed with a surface area that is larger than the area of the measuring electrode.

7. A pressure transmitter, comprising a pressure transducer, as claimed in claim 1.

* * * * *